United States Patent [19]

Asakura

[11] Patent Number: 4,644,511
[45] Date of Patent: Feb. 17, 1987

[54] DISPLAY SYSTEM FOR FISH SONAR
[75] Inventor: Kunio Asakura, Aichi, Japan
[73] Assignee: Keisuke Honda, Aichi, Japan
[21] Appl. No.: 745,263
[22] Filed: Jun. 14, 1985
[51] Int. Cl.$^4$ .......................... G01S 7/56; G01S 15/96
[52] U.S. Cl. ..................................... 367/101; 367/113
[58] Field of Search ................................ 367/101, 113
[56] References Cited

U.S. PATENT DOCUMENTS

| 4,290,125 | 9/1981 | Honda | 367/101 |
| 4,300,216 | 11/1981 | Barton, Jr. | 367/113 |
| 4,397,008 | 8/1983 | Ziese | 367/113 |

FOREIGN PATENT DOCUMENTS 0162068 12/1981 Japan .................................... 367/113

Primary Examiner—Richard A. Farley
Attorney, Agent, or Firm—Burgess, Ryan & Wayne

[57] ABSTRACT

A display system for fish sonar displays two ultrasonic echo signals of different frequencies from the left side to the central portion and from the central portion to the right side on the screen of a cathode ray tube. After the two ultrasonic echo signals are displayed on the entire screen of the cathode ray tube, the old echo signals are eliminated and the display is refreshed with new echo signals so that a picture of a school of small fish which is displayed by ultrasonic echo signals of high frequency can be compared with a horizontally adjacent picture of a large fish simultaneously displayed by ultrasonic echo signals of low frequency on a single cathode ray tube screen.

3 Claims, 2 Drawing Figures

DISPLAY SYSTEM FOR FISH SONAR

BACKGROUND OF THE INVENTION

The present invention relates to a display system for fish sonar in which two echo signals of different frequency are respectively displayed on the right and left portions of the screen of a cathode ray tube.

Generally, an ultrasonic wave of a high frequency is reflected by small fish in the surface of the sea. An ultrasonic wave of a low frequency is reflected by large fish in the deep portion of the sea. Therefore, the transducers of the fish sonar selectively use a high frequency or a low frequency for detecting small fish or large fish respectively.

A fish sonar having a cathode ray tube displays the echo signals received by one ultrasonic transducer on its screen. Therefore, when a fisherman wishes to observe both the high frequency and the low frequency sonar echo signals at the same time, the respective high and low frequency signals are simultaneously displayed by two separate fish sonars, or are alternately displayed by one fish sonar.

However, the cost of two fish sonars is high and the one fish sonar cannot display the high and low frequency signals at the same time.

In order to eliminate these deficiencies, a new fish sonar in which the high and low frequency echo signals are simultaneously displayed on vertically spaced portions of an electronically split screen of a cathode ray tube, has been recently developed.

In this fish sonar, however, it is difficult to compare the displays of the two signals with each other, because these displays are necessarily vertically compressed and vertically spaced apart.

SUMMARY OF THE INVENTION

It is therefore, the primary object of the present invention to provide a display system for fish sonar of easily observable and comparatively compact construction and low cost.

Another object of this invention is to provide a display system for fish sonar capable of simultaneously displaying two echo signals of different frequency on the right and left sides of the screen of a single cathode ray tube.

Still another object of this invention is to provide a display system for fish sonar capable of observing the relative positions of small fish and large fish.

In order to accomplish the above and other objects, the present invention provides a display system for fish sonar, comprising: two transmitters for transmitting first and second output pulse signals of different frequency by trigger signals produced from a central processor unit (CPU), transmitting-receiving vibrators for transmitting first and second ultrasonic waves of different frequencies in response to the first and second output pulse signals from the transmitter and for receiving corresponding first and second echoes, amplifiers for amplifying first and second echo signals received by the transmitting-receiving vibrators, analog-to-digital (A/D) converters for converting the first and second echo signals amplified by the amplifiers to first and second digital echo signals, a buffer memory for storing the first and second digital echo signals from the A/D converters, a digital random-access-memory (D-RAM) for storing the first and second digital echo signals from the buffer memory in response to every one or plural trigger signals from the CPU, an echo writing raw address circuit for designating a raw address for the first and second digital echo signals stored in the D-RAM, an echo writing column address circuit for designating a column address for the first and second digital echo signals, an image memory for storing the first and second digital echo signals according to the address signals from the echo writing raw address circuit and the echo writing column address circuit, a cathode ray tube for horizontally scanning a raster thereof and connected to the image memory, and a read out address circuit for reading out the first and second echo digital signals stored in the image memory in synchronism with the lines of the raster of the cathode ray tube according to the raw address, for reading out the first digital echo signals in accordance with the columns designated from the column of the one side to the center column of the screen of the cathode ray tube, and for reading out the second digital echo signals in accordance with the columns designated from the center column of the screen to the column of the other side of the screen, respectively.

These and other objects, features and advantages of the invention will become more apparent from the following description taken in connection with the accompanying drawings.

DESCRIPTION OF THE PREFERRED EMBODIMENT

Figure 1:
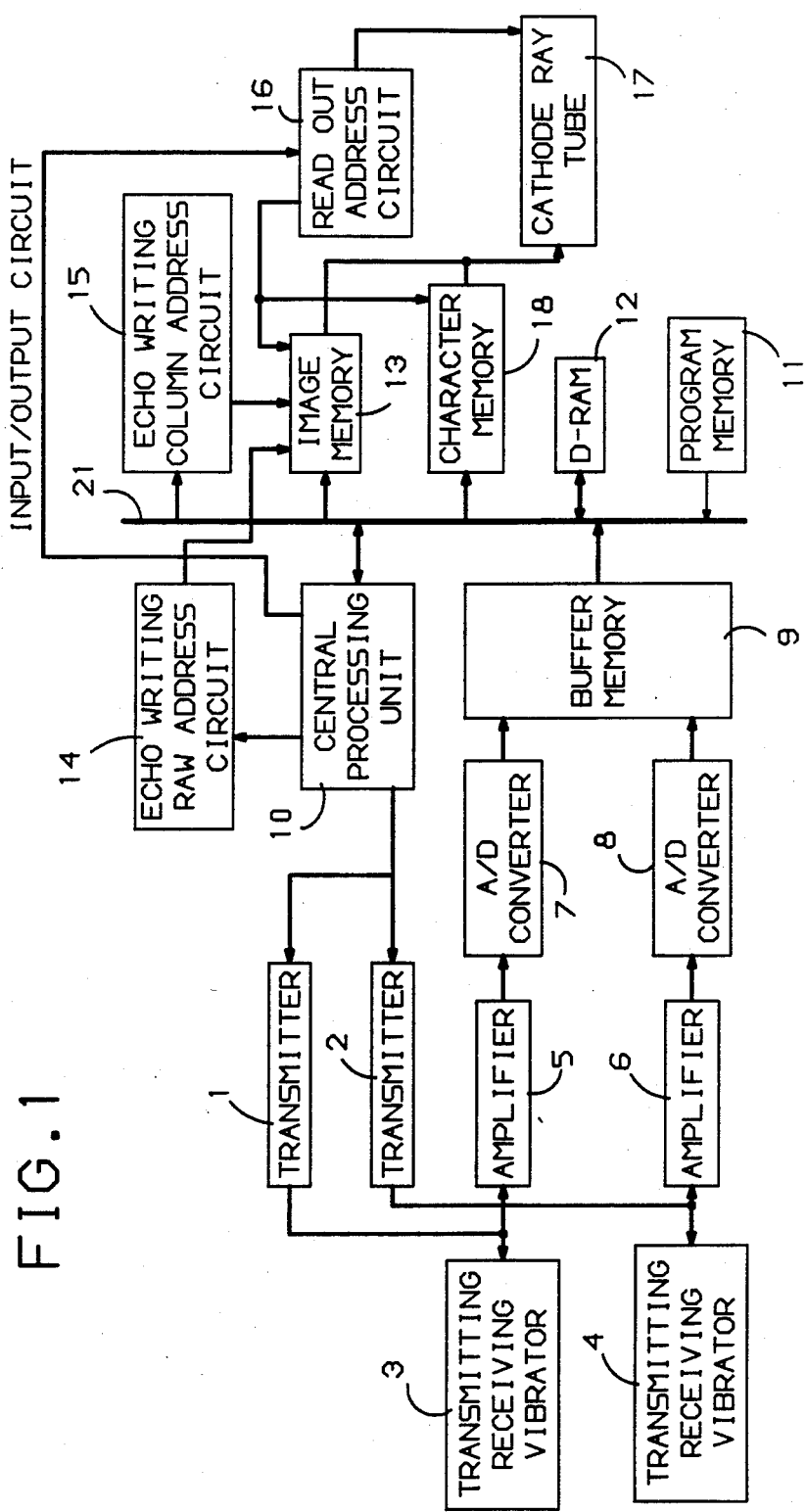
FIG. 1 illustrates a schematic block diagram of a display system for fish sonar according to an embodiment of the present invention.

Referring to FIG. 1 of the drawings, the output terminals of high and low frequency ultrasonic transmitters 1 and 2 are connected to transmitting-receiving vibrators or transducers 3 and 4 and amplifiers 5 and 6, respectively. The output terminals of the amplifiers 5 and 6 are connected to analog-to-digital (A/D) converters 7 and 8. The output terminals of the A/D converters 7 and 8 are connected to a buffer memory 9, and the output terminal of the buffer memory 9 is connected to an input/output circuit.

The input/output circuit 21 connects to a central processing unit (CPU) 10, a program memory 22, digital random-access-memory (D-RAM) 12, an image memory 13, an echo writing column address circuit 15 and a character memory 18, respectively.

The CPU 10 connects to the input terminals of the transmitters 1 and 2, an echo writing raw address circuit 14 and a read out address circuit 16. The output terminals of the echo writing raw address circuit 14, the read out address circuit 16 and the echo writing column address circuit 15 are connected to the image memory 13.

The output terminals of the image memory 13 and the character memory 18 are connected to a cathode ray tube 17, and the output of the read out address circuit 16 is connected to the image memory 13 and the cathode ray tube 17.

The mode of the operation of this embodiment will be described with reference to the display screen of the cathode ray tube 17 in FIG. 2. When the first and second output pulses of the different ultrasonic frequencies are produced by the transmitters 1 and 2 in response to trigger pulses from the CPU 10 respectively, the first and second output pulses are converted to corresponding first and second ultrasonic waves of the different frequencies in the transmitting-receiving vibrators 3 and 4, whch ultrasonic waves are respectively emitted in the sea or a body of water.

The first and second high frequency and low frequency echoes of the ultrasonic waves respectively reflected by a school of fish, are received by the transmitting-receiving vibrators 3 and 4 and are converted to respective first and second echo signals to be amplified by the amplifiers 5 and 6.

The first and second echo signals which are amplified are converted to first and second digital echo signals by A/D converters 7 and 8, respectively. After the first and second digital echo signals are stored in the buffer memory 9, these signals are transmitted to D-RAM 12.

Figure 2:
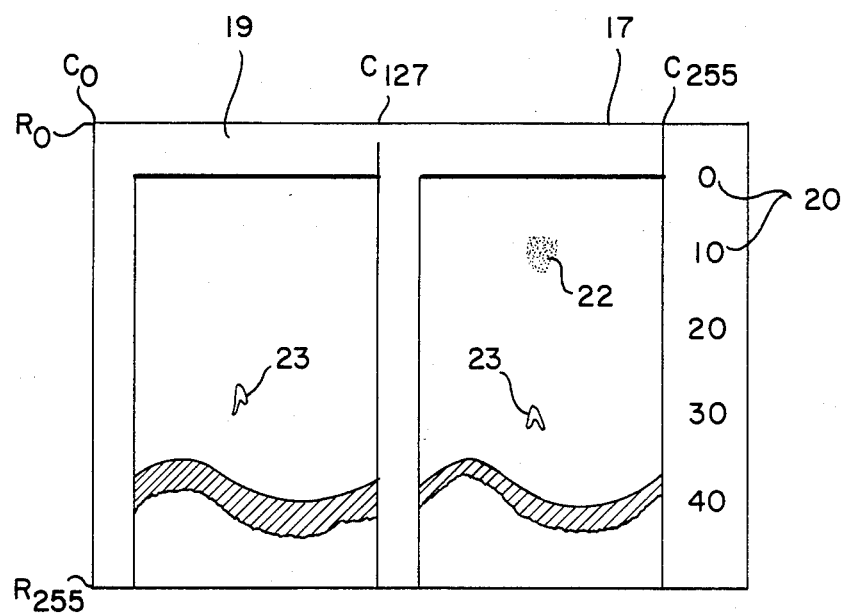
FIG. 2 illustrates a display screen of the cathode ray tube shown in FIG. 1.

As shown in FIG. 2, the raster of the cathode ray tube 17 is horizontally scanned and the digital echo signals are vertically displayed. When the number of thus far generated lines of the raster in the screen of the cathode ray tube 17 is for example 256, these lines are designated from the top to the bottom by $R_0, R_1, \ldots, R_{255}$ and the corresponding digital echo signal samples are designated by line addresses of 1 to 256 at intervals determined by each trigger pulse from the CPU 10.

When the screen of the cathode ray tube is vertically divided into, for example, 256 columns, the columns of the screen of the cathode ray tube are designated from left to right by $C_0, C_1, \ldots, C_{255}$; the first (e.g. high frequency) digital echo signals are designated by the column addresses of $C_{128}$–$C_{255}$ to display from the left edge to the central portion of the screen of the cathode ray tube, and the second (e.g. low frequency) digital echo signals are designated by the column addresses of $C_0$–$C_{127}$ to display from the central portion to the right edge of the screen of the cathode ray tube.

The first and second digital echo signals are latched by the D-RAM 12 and are transmitted to the image memory 13. Whenever the trigger signals are transmitted from the CPU 10 to the transmitters 1 and 2, a new set of first and second digital echo signals is stored in the image memory by the above operation.

The first and second digital echo signals which are stored in the image memory are read out in synchronization with the line signals of the raster on the screen of the cathode ray tube 17, by the read out address circuit 16. That is, the read out first digital echo signals are sequentially moved from the column $C_{255}$ to the column $C_{128}$ of the screen 19; and the second digital echo signals are sequentially moved from the column $C_{127}$ to the column $C_0$ of the screen 19. After the first and second digital signals are displayed on the whole of the screen 19 (the column $C_{255}$ to the column $C_{128}$ and the column $C_{127}$ to the column $C_0$) respectively, when new first and second digital echo signals are stored in the image memory 13 respectively, the old first and second digital echo signals which reach the columns $C_{128}$ and $C_0$ respectively are eliminated from the image memory 13.

In the embodiment of the present invention, when the first digital echo signals are of a high frequency and the second digital echo signals are of a low frequency, a school of fish 22 and a large fish 23 are displayed in the right hand of the screen 19, and the large fish 23 is also displayed in the left hand of the screen 19.

The character memory 18 stores numerals and figures to display the depth of the sea in the screen 19 of the cathode ray tube 17. For instance, the numerals (or figures 20) are displayed at the right edge of the screen 19.

In the above description, the first and second digital echo signals are stored in the D-RAM 12 at sampling intervals corresponding to every trigger signal from the CPU 10. Instead of this, a plurality of first and second digital echo signals may be stored in the buffer memory 9 for each predetermined plural number of triggers from the CPU 10, or the respective averages of the first and second digital echo signals may be stored in the D-RAM 12. Also, the maximum value of a plurality of first and second digital echo signals which are stored in the buffer memory 9 may be respectively stored in the D-RAM 12.

What is claimed is:

1. A display system for fish sonar apparatus, comprising:

CPU means for producing trigger signals;

two transmitters for transmitting first and second output pulse signals of different frequencies in response to said trigger signals;

transmitting-receiving vibrators for transmitting first and second ultrasonic waves of different frequencies in response to the first and second output pulse signals from the transmitters and for receiving first and second echo signals from said first and second ultrasonic waves;

amplifiers for amplifying said first and second echo signals received from the transmitting-receiving vibrators;

A/D converters for converting the first and second echo signals amplified by the amplifiers to first and second digital echo signals;

a buffer memory for storing the first and second digital echo signals from the A/D converters;

a D-RAM for storing the first and second digital echo signals from the buffer memory in response to a group of at least one trigger signal from the CPU means;

an echo writing raw address circuit for designating a raw address to the first and second digital echo signals stored in the D-RAM;

an echo writing column address circuit for designating a column address to the first and second digital echo signals;

an image memory for storing the first and second digital echo signals by the address signals from the echo writing raw address circuit and the echo writing column address circuit;

a cathode ray tube for horizontally scanning a raster on a screen thereof and connected to the image memory; and a read out address circuit for reading out the first and second digital echo signals stored in the image memory in synchronism with lines of the raster of the cathode ray tube being scanned according to the raw address of said signals, for reading out the first digital echo signals in accordance with the columns from the column of the raster being scanned from one side to the center column of the screen of the cathode ray tube and for reading out the second digital echo signals in accordance with the columns of the raster being scanned from the center column of the screen to a column on the other side of the screen.

2. A display system as defined in claim 1, wherein first and second digital echo signals which are displayed on said cathode ray tube are eliminated by inputting first and second new digital echo signals in the image memory.

3. A display screen as defined in claim 1, wherein said cathode ray tube is connected to a character memory for displaying numerals or figures corresponding to the depth of a body of water in one portion of the screen of said cathode ray tube.

* * * * *